Figure 1:
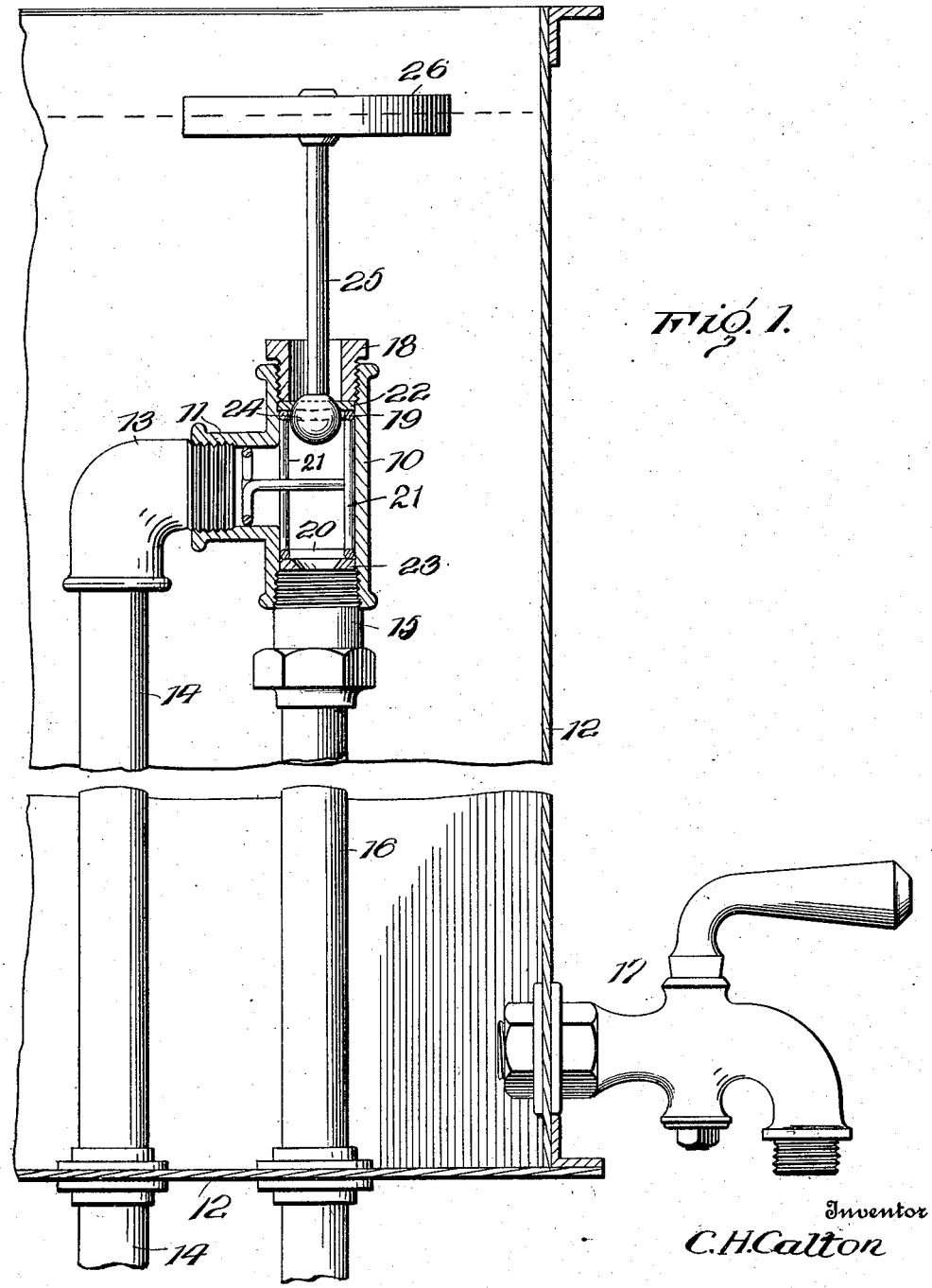

C. H. CALTON.
TRANSPOSABLE VALVE.
APPLICATION FILED DEC. 7, 1915.

1,191,396.

Patented July 18, 1916.
2 SHEETS—SHEET 1.

Inventor
C. H. Calton

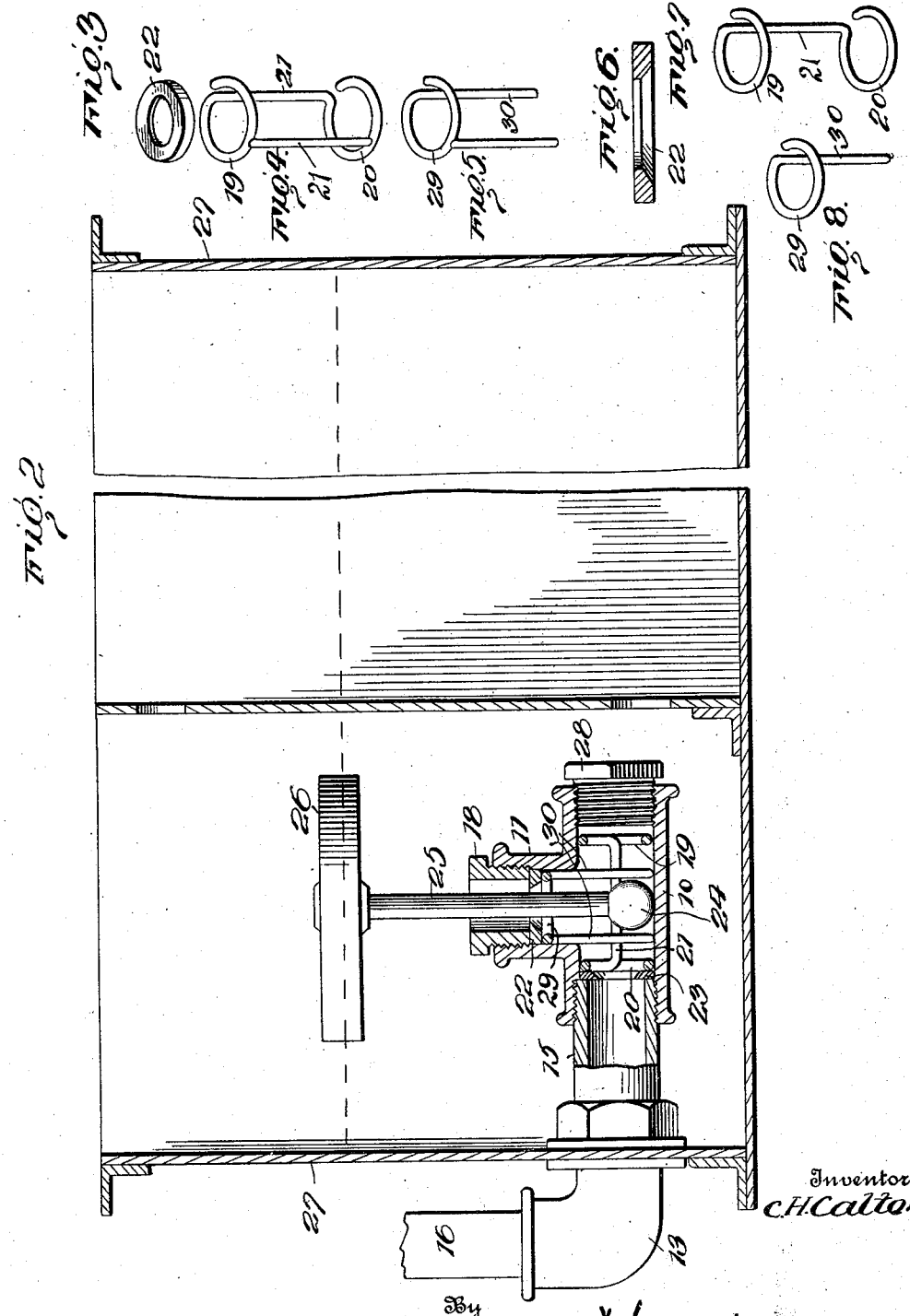

UNITED STATES PATENT OFFICE.

CHARLES H. CALTON, OF BRINGHURST, INDIANA.

TRANSPOSABLE VALVE.

1,191,396.  Specification of Letters Patent.  Patented July 18, 1916.

Application filed December 7, 1915. Serial No. 65,544.

*To all whom it may concern:*

Be it known that I, CHARLES H. CALTON, a citizen of the United States, residing at Bringhurst, in the county of Carroll and State of Indiana, have invented certain new and useful Improvements in Transposable Valves, of which the following is a specification.

This invention relates to improvements in valves adapted to be arranged without structural change for use in connection with a supply tank or with a watering trough and to automatically control the supply for the tank and the trough, and has for one of its objects to improve the construction and increase the efficiency and utility of devices of this character.

The improved device is designed more particularly for use upon farms where a water tank for supplying the house and water troughs for live stock are employed and so arranged that the water in the tank is automatically maintained at a predetermined level or stage, and any surplus automatically conducted to the water trough.

The improvement comprises a valve connected into the water supply, and so arranged that the same form of valve may be adapted without material structural change for use either in the tank or in the water trough.

In the drawings, illustrative of the preferred embodiment of the invention,—Figure 1 is a view of a conventional supply tank with the improved valve arranged therein; Fig. 2 is a view of a conventional watering trough with the valve arranged therein; Fig. 3 is a detached perspective view of one of the valve seats; Fig. 4 is a detached perspective view of the support for the valve seats when the device is employed for a tank, as shown in Fig. 1; Fig. 5 is a detached perspective view of the support for one of the valves when the device is arranged as shown in Fig. 2; Fig. 6 is an enlarged sectional detail of one of the valve seats; Figs. 7 and 8 are views similar to Figs. 4 and 5, illustrating modifications in the manner of constructing the valve supports.

Corresponding and like parts are referred to in the following description and indicated in all the views of the drawings by the same reference characters.

The improved valve comprises a tubular body 10 having a right angled branch 11 communicating with the body intermediate its ends. At its ends the body 10 is internally threaded, while the branch 11 is internally threaded, the threads being of the same size, or gage, so that the parts which engage the threads may be transposed or interchanged. When employed in a supply tank, represented conventionally at 12, the body 10 is arranged in a vertical position near the upper part of the tank with an elbow 13 connected into the branch 11 and into which the main supply pipe 14 from the pump is conducted. A sleeve or collar 15 is connected into one end of the body 10 to receive a conductor pipe 16 which leads to the supply pipe of a watering trough or other receptacle, as hereafter explained. The tank 12 is provided with a draw off valve or spigot 17 of the ordinary construction. Connected into the upper end of the body 10 is another sleeve 18, the latter having a relatively large opening therethrough, as shown. Disposed within the body 10 are split rings 19—20 formed of resilient material and preferably connected by bars 21, the rings 19—20 and the bars 21 being formed from resilient wire. The rings 19—20 by their natural expansion will engage the inner walls of the body 10 and thus be retained by friction within the body. An annular valve seat 22 is located between the ring 19 and the sleeve 18, while a similar annular valve seat 23 is located between the ring 20 and the sleeve or collar 15. By this means the valve seats are maintained in position, and are arranged with their bearing faces directed inwardly or toward each other, as represented in Fig. 1.

A valve 24, preferably of ball-shape, is located within the body 10 between the valve seats, and is provided with a relatively long stem 25 extending through the sleeve 18 and provided with a float 26 upon its upper end. The valve 24 will be normally seated upon the lower valve seat 23, as illustrated in Fig. 1, so that the water will be free to flow through the intake 14, elbow 13, body 10 and sleeve 18, but when the water rises in the tank to a sufficient height to influence the float 26, the float is elevated and thus causes the valve 24 to rise and engage the valve seat 22, thus shutting off the water, but permitting the water to flow through the collar or sleeve 15 and pipe 16. This flow will continue so long as the supply in the tank is sufficient to maintain the valve 24 in its upper position, but when the water in the tank falls to a sufficient extent to release the float 26, the valve 24 again falls to its lower position and shuts off the flow through the pipe 16 and opens the flow through the pipe 14 in to the tank. Thus the supply in the tank is automatically controlled.

When the valve device is employed in a watering trough, illustrated conventionally at 27, the body 10 is disposed horizontally, as shown in Fig. 2, with the branch 11 vertical. When thus arranged the elbow 13 is turned upwardly to receive the lower end of the discharge 16 and connected to the branch 15 which is disposed in one end of the body 10, while the sleeve 18 is disposed within the branch 11. The other end of the body 10 is closed by a solid plug 28. The valve seat 22 is disposed within the branch 11 and held in position by a resilient split ring 29, similar to the rings 19—20 and held in position by supporting bars 30. The valve 24 is disposed within the body 10 with its stem 25 extending through the branch 11 and the sleeve 18, with the float 26 in the same relative position as when employed in the tank. By this arrangement it will be obvious that when the water in the watering trough is at a low stage the valve 24 will rest upon the lower portion of the body 10 so that the water will flow into the trough through the connection 16—13 and sleeve 18, but when the water rises to a sufficient extent to effect the float 26, the latter will be elevated and automatically shut off the further flow. It will thus be obvious that the flow is automatically controlled and all waste prevented.

If preferred the split rings 19—20 may be coupled by a single bar 21, as shown in Fig. 7, or the split ring 29 supported by a single bar 30, as shown in Fig. 8.

Having thus described the invention, what is claimed as new is:—

1. In a device of the class described, a casing having an intermediate branch extending at right angles therefrom, annular valve seats adapted to be interchangeably disposed within said casing and its branch, a float valve operative alternately upon said valve seats and having a stem adapted to project through the valve seat which is nearer the float, said float being carried by said stem.

2. In a device of the class described, a casing having an intermediate branch extending at right angles therefrom, sleeves adapted to be interchangeably engaged in the ends of said casing or its branch, annular valve seats supported from outward displacement by said sleeves, means for supporting said valve seats from inward displacement, a float valve operative alternately upon said valve seats and having a stem adapted to project through the valve seat and sleeve which are nearest the float, the float being carried by said stem.

3. In a device of the class described, a casing, sleeves adapted to be interchangeably engaged in the ends of said casing, annular valve seats supported from outward displacement by said sleeves, split resilient rings within said casing and engaging said valve seats and holding them from inward displacement, a float valve operative alternately upon said valve seats and having a stem adapted to project through the seat and sleeve which are nearest the float, said float being carried by said stem.

4. In a device of the class described, a casing, sleeves adapted to be interchangeably engaged in the ends of said casing, annular valve seats supported from outward displacement by said sleeves, split resilient rings within said casing and engaging said valve seats and holding them from inward displacement, a stay connecting said rings and holding them in spaced relation, a float valve operative alternately upon said valve seats and having a stem adapted to project through the seat and sleeve which are nearest the float, said float being carried by said stem.

In testimony whereof, I affix my signature.

CHARLES H. CALTON.